United States Patent
Hundemer et al.

(10) Patent No.: US 10,270,832 B1
(45) Date of Patent: Apr. 23, 2019

(54) METHOD AND SYSTEM FOR MODIFYING A MEDIA STREAM HAVING A VARIABLE DATA RATE

(71) Applicant: Tribune Broadcasting Company, LLC, Chicago, IL (US)

(72) Inventors: Hank J. Hundemer, Bellevue, KY (US); Dana A. Lasher, Morgan Hill, CA (US); Richard M. Lasher, San Jose, CA (US)

(73) Assignee: Tribune Broadcasting Company, LLC, Chicago, IL (US)

( * ) Notice: Subject to any disclaimer, the term of this patent is extended or adjusted under 35 U.S.C. 154(b) by 140 days.

(21) Appl. No.: 15/395,313

(22) Filed: Dec. 30, 2016

(51) Int. Cl.
*H04L 29/06* (2006.01)
*H04L 29/12* (2006.01)

(52) U.S. Cl.
CPC ........ *H04L 65/602* (2013.01); *H04L 61/6068* (2013.01); *H04L 65/4015* (2013.01)

(58) Field of Classification Search
CPC ............... H04L 61/6068; H04L 65/602; H04L 65/4015; H04L 60/80; H04L 12/1854; H04L 65/4084; H04L 65/601; H04L 65/605; H04L 65/607; H04L 67/2814; H04L 65/104; H04L 65/105; H04L 65/4076; H04L 65/4092; H04L 65/60; H04L 65/608; H04L 67/10; H04L 67/2823; H04L 69/04; H04L 12/18; H04L 12/1881; H04L 1/0011; H04L 1/0043; H04L 1/0052; H04L 29/06027; H04L 67/06; H04L 67/28; H04L 67/2804; H04L 67/2852; H04L 67/2871; H04L 67/42; H04L 69/329; H04N 21/2343; H04N 21/41407; H04N 21/6581; H04N 21/2389; H04N 21/242; H04N 21/274; H04N 21/4122; H04N 21/4126; H04N 21/4147; H04N 21/4302; H04N 21/4305; H04N 21/43637; H04N 21/4385; H04N 21/440218; H04N 21/4621; H04N 21/8456; H04N 21/23106; H04N 21/234354; H04N 21/234363; H04N 21/234381; H04N 21/23439;
(Continued)

(56) References Cited

U.S. PATENT DOCUMENTS

| 9,407,355 B1* | 8/2016 | Lerner ............... H04B 7/18595 |
| 2002/0131496 A1* | 9/2002 | Vasudevan ......... H04N 21/2402 375/240.11 |
| 2004/0003101 A1* | 1/2004 | Roth ................. H04L 29/06027 709/231 |
| 2007/0200948 A1* | 8/2007 | Kim ................... H04N 21/2343 348/385.1 |

(Continued)

*Primary Examiner* — Chris Parry
*Assistant Examiner* — Abderrahmen Chouat
(74) *Attorney, Agent, or Firm* — McDonnell Boehnen Hulbert & Berghoff LLP

(57) ABSTRACT

In one aspect, an example method for modifying a media stream having a variable data rate includes: (i) receiving, by a first computing system, a media stream generated by a second computing system, the media stream representing media content and having a variable data rate; (ii) determining, by the first computing system, a target constant data rate at which a third computing system has requested to receive the media stream; and (iii) while receiving the media stream: (a) modifying, by the first computing system, the media stream to have a modified data rate that is based on the determined target constant data rate; and (b) transmitting, by the first computing system, to the third computing system, the media stream having the modified data rate.

12 Claims, 4 Drawing Sheets

(58) Field of Classification Search
CPC ......... H04N 21/23608; H04N 21/2747; H04N 21/4334; H04N 21/4335; H04N 21/44209; H04N 21/472; H04N 21/6379; H04N 21/845; H04N 5/765; H04N 7/17318; H04N 9/8042; H04N 9/8205; H04N 9/8715; H04N 19/156; H04N 19/40; H04N 21/23406; H04N 21/23611; H04N 21/2365; H04N 21/23805; H04N 21/2381; H04N 21/2402; H04N 21/25808; H04N 21/2662; H04N 21/4347; H04N 21/44004; H04N 21/4436; H04N 21/6131; H04N 21/64315; H04N 21/6582
See application file for complete search history.

(56) References Cited

U.S. PATENT DOCUMENTS

| | | | | |
|---|---|---|---|---|
| 2009/0259730 | A1* | 10/2009 | Machida | H04N 7/17318 709/219 |
| 2010/0008385 | A1* | 1/2010 | Noronha, Jr. | H04N 21/2389 370/545 |
| 2012/0005361 | A1* | 1/2012 | Knittle | H04L 12/66 709/231 |
| 2012/0284765 | A1* | 11/2012 | Killick | H04N 21/274 725/111 |
| 2014/0208374 | A1* | 7/2014 | Delaunay | H04N 21/2343 725/109 |
| 2016/0164992 | A1* | 6/2016 | Prasad | H04L 67/2814 709/217 |
| 2016/0294912 | A1* | 10/2016 | Lee | H04N 21/4122 |

* cited by examiner

METHOD AND SYSTEM FOR MODIFYING A MEDIA STREAM HAVING A VARIABLE DATA RATE

In this disclosure, with respect to all reasonable derivatives of such terms, unless otherwise specified and/or unless the particular context clearly dictates otherwise, each usage of "a" or "an" means at least one, and each usage of "the" means the at least one.

SUMMARY

In a first aspect, an example method includes: (i) receiving, by a first computing system, a media stream generated by a second computing system, the media stream representing media content and having a variable data rate; (ii) determining, by the first computing system, a target constant data rate at which a third computing system has requested to receive the media stream; and (iii) while receiving the media stream: (a) modifying, by the first computing system, the media stream to have a modified data rate that is based on the determined target constant data rate; and (b) transmitting, by the first computing system, to the third computing system, the media stream having the modified data rate.

In a second aspect, a non-transitory computer-readable medium is disclosed. The computer-readable medium has stored thereon instructions that, upon execution by a processor, cause performance of a set of acts including: (i) receiving, by a first computing system, a media stream generated by a second computing system, the media stream representing media content and having a variable data rate; (ii) determining, by the first computing system, a target constant data rate at which a third computing system has requested to receive the media stream; and (iii) while receiving the media stream: (a) modifying, by the first computing system, the media stream to have a modified data rate that is based on the determined target constant data rate; and (b) transmitting, by the first computing system, to the third computing system, the media stream having the modified data rate.

In a third aspect, a first computing system is configured for performing a set of acts including: (i) receiving a media stream generated by a second computing system, the media stream representing media content and having a variable data rate; (ii) determining a target constant data rate at which a third computing system has requested to receive the media stream; and (iii) while receiving the media stream: (a) modifying the media stream to have a modified data rate that is based on the determined target constant data rate; and (b) transmitting, to the third computing system, the media stream having the modified data rate.

DETAILED DESCRIPTION

I. Overview

Figure 1:
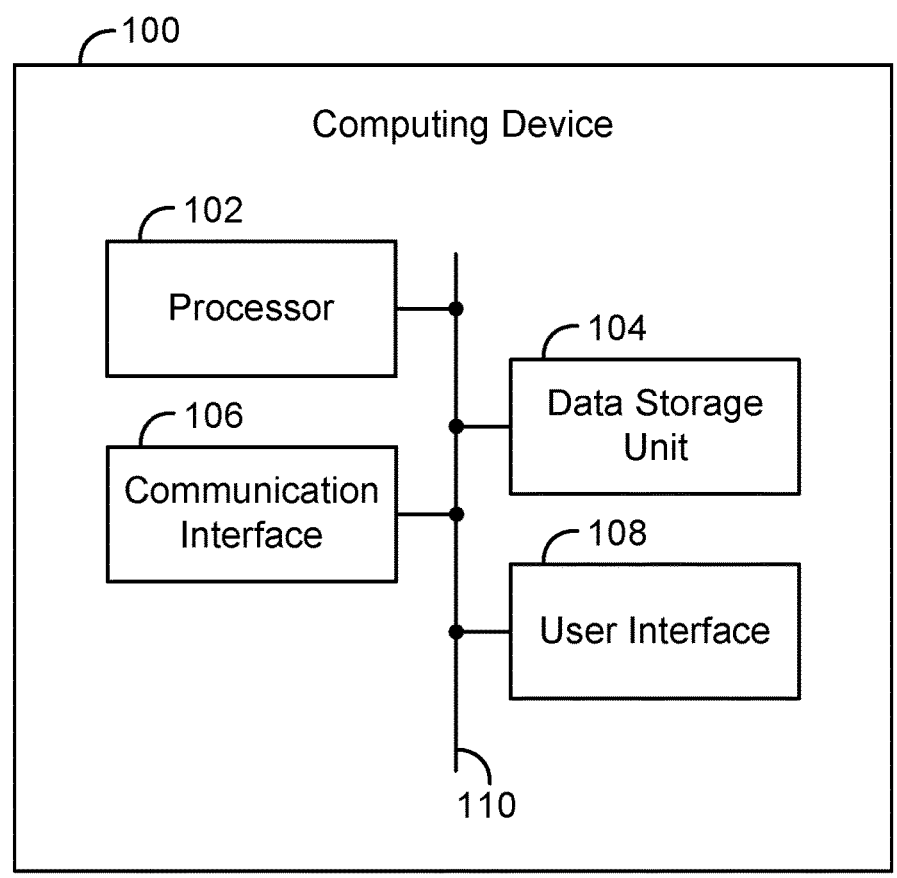
FIG. 1 is a simplified block diagram of an example computing device.

Although examples are provided herein in the context of video content and video streams, the features discussed herein can similarly be applied in the context of audio content and audio streams, and more thus generally as media content and media streams.

Computing systems, such as mobile phones, tablet computers, and laptop computers, can generate and output video content in the form of streaming video. For example, while a computing system is capturing video content using a camera, the computing system can provide the video content to other devices, in real-time, in the form of a live video stream.

The computing system can generate the video stream in various ways. For example, a video-capturing device (e.g., a camera) of the computing system can capture video content, and an encoder of the computing system can encode the video content to generate a video stream having a particular data rate (e.g., a bit rate). The video stream can also be formatted into packets of data, which are stored temporarily in a memory buffer of the computing system before the computing system transmits the packets from the memory buffer to another entity, such as another memory buffer and/or another destination device. For instance, the computing system can transmit the packets to a destination device configured to receive the packets and, in turn, transmit the video stream to various end-user devices.

In some instances, the computing system can encode the video content such that the video stream has a variable data rate. However, the destination device to which the computing system is transmitting the video stream can request or otherwise expect to receive the video stream at a target constant data rate.

The present disclosure provides a technique for dynamically modifying the variable data rate video stream to produce a video stream having a modified data rate that is based on the target constant data rate. In addition, the present disclosure provides an intermediary device that can implement the technique, where the intermediary device can sit between the computing system and the destination device and can have connections with both the computing system and the destination device.

According to the present disclosure, an example method includes a first computing system receiving a video stream generated by a second computing system, the video stream representing video content and having a variable data rate. The first computing system can be the intermediary device discussed above, and the second computing system can be the computing system discussed above. The second computing system can generate the video stream in the manner discussed above.

The example method also includes the first computing system determining a target constant data rate at which a third computing system has requested to receive the video stream. The third computing system can be the destination device discussed above.

Further, the example method includes, while receiving the video stream, the first computing system modifying the video stream to have a modified data rate that is based on the determined target constant data rate. In one example, the first computing system can modify the video stream such that the resulting modified data rate of the video stream has a predefined threshold extent of similarity to the target constant data rate. For instance, the first computing system can add a quantity of null packets into the video stream, which can cause the data rate of the video stream to have the predefined threshold extent of similarity to the target constant data rate.

Still further, the example method includes, while receiving the video stream, the first computing system transmitting, to the third computing system, the video stream having the modified data rate.

With this technique, the intermediary device can provide the destination device with a video stream that meets the destination device's expectations (i.e., a video stream that the destination device is configured/required to receive), and can thereby facilitate provision of the video stream to other devices, such as end-user devices, with minimal or no latency.

II. Example Architecture

A. Computing Device

FIG. 1 is a simplified block diagram of an example computing device 100. Computing device 100 can perform various acts and/or functions, such as those described in this disclosure (including the accompanying drawings). Computing device 100 can include various components, such as processor 102, data storage unit 104, communication interface 106, and/or user interface 108. These components can be connected to each other (or to another device, system, or other entity) via connection mechanism 110.

In this disclosure, the term "connection mechanism" means a mechanism that facilitates communication between two or more devices, systems, or other entities. A communication mechanism can be a relatively simple mechanism, such as a cable or system bus, or a relatively complex mechanism, such as a packet-based communication network (e.g., the Internet). In some instances, a connection mechanism can include a non-tangible medium (e.g., where the connection is wireless).

Processor 102 can include a general-purpose processor (e.g., a microprocessor) and/or a special-purpose processor (e.g., a digital signal processor (DSP)).

Data storage unit 104 can include one or more volatile, non-volatile, removable, and/or non-removable storage components, such as magnetic, optical, or flash storage, and/or can be integrated in whole or in part with processor 102. Further, data storage unit 104 can take the form of a non-transitory computer-readable storage medium, having stored thereon program instructions (e.g., compiled or non-compiled program logic and/or machine code) that, when executed by processor 102, cause computing device 100 to perform one or more acts and/or functions, such as those described in this disclosure. As such, computing device 100 can be configured to perform one or more acts and/or functions, such as those described in this disclosure. Such program instructions can define and/or be part of a discrete software application. In some instances, computing device 100 can execute program instructions in response to receiving an input, such as from communication interface 106 and/or user interface 108.

Data storage unit 104 can also store other types of data, such as those types described in this disclosure. In one example, data storage unit 104 can include one or more memory buffers that can receive, from one or more other components of computing device 100, a video stream in the form of data packets and can then temporarily store the data packets. In some instances, the memory buffer(s) can take the form of a data queue (i.e., a memory buffer that employs a First-In First-Out (FIFO) scheme).

Communication interface 106 can allow computing device 100 to connect to and/or communicate with another entity according to one or more protocols. In one example, communication interface 106 can be a wired interface, such as an Ethernet interface or a high-definition serial-digital-interface (HD-SDI). In another example, communication interface 106 can be a wireless interface, such as a cellular (e.g., 4G or 3G) or a Wi-Fi interface. Each connection described in this disclosure can be a direct connection or an indirect connection, the latter being a connection that passes through and/or traverses one or more entities, such as such as a router, switcher, or other network device. Likewise, each transmission described in this disclosure can be a direct transmission or an indirect transmission.

User interface 108 can facilitate interaction between computing device 100 and a user of computing device 100, if applicable. As such, user interface 108 can include input components such as a keyboard, a keypad, a mouse, a touch-sensitive panel, a microphone, and/or a camera, and/or output components such as a display device (which, for example, can be combined with a touch-sensitive panel), a sound speaker, and/or a haptic feedback system.

Computing device 100 can take various forms, such as a workstation, a desktop computer, a laptop, a tablet, a television, a set-top box, a mobile phone (e.g., a smart phone), and/or a server (e.g., a streaming media server).

B. Computing System

Figure 2:
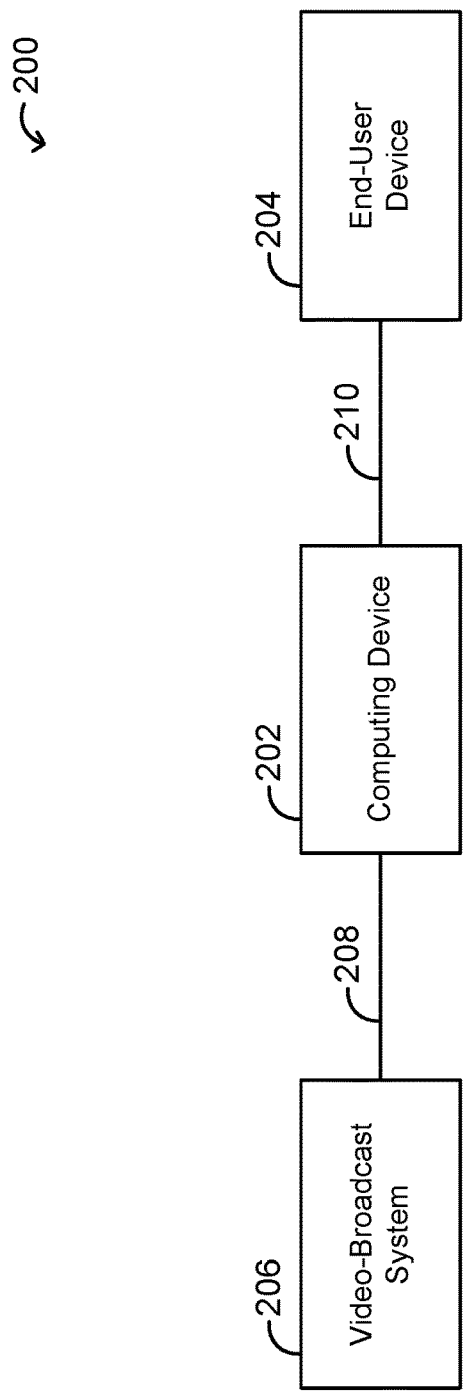
FIG. 2 is a simplified block diagram of an example computing system.

FIG. 2 is a simplified block diagram of an example computing system 200. In this disclosure, a computing system is a system that includes at least one computing device. In some instances, a computing system can include at least one other computing system.

Computing system 200 can include various components, such as computing device 202 (e.g., computing device 100), end-user device 204, and video-broadcast system (VBS) 206, each of which can be implemented as a computing system. Computing system 200 can also include connection mechanism 208, which connects computing device 202 with VBS 206; and connection mechanism 210, which connects computing device 202 with end-user device 204.

Computing device 202 can take various forms. For instance, computing device 202 can take the form of computing device 100 described above.

End-user device 204 can take various forms, such as a workstation, a desktop computer, a laptop, a tablet, a television, a set-top box, and/or a mobile phone (e.g., a smart phone). End-user device 204 can include one or more of the components discussed above with respect to computing device 100, such as a data storage unit, communication interface, and user interface.

End-user device 204 can include other components as well. For instance, end-user device 204 can include a camera system, where the camera system includes various components for facilitating capture and processing of video content, such as a camera, a frame grabber, and an encoder. The camera can capture video content in the form of a series of still digital images, or "frames," and perhaps then transmit the video content to the encoder. The frame grabber can interface with the camera to assist in capturing the video content, such as by receiving the video content from the camera and then storing the video content and/or transmitting the video content to the encoder. The encoder can receive the video content from the frame grabber (or, in some instances, directly from the camera itself), encode the video content to generate a video stream, format the video stream into data packets, and transmit the packets of the video stream to a data storage unit (e.g., a memory buffer) of end-user device 204, which can receive and temporarily store the packets.

The encoder can encode video content according to various standards. For example, the encoder can encode video content in accordance with the H.264 (MPEG-4 AVC) standard, the MPEG-2 Part 2 standard, or the VP8 standard.

With the components discussed above, end-user device 204 can generate video content such as a video stream. In an example scenario, as end-user device 204 generates the video stream, one or more components of computing system 200, such as computing device 202, can receive the video stream from end-user device 204 and can in turn provide the video stream (e.g., a modified version of the video stream, as discussed in detail below) to VBS 206. VBS 206 can then in turn provide the video stream (e.g., the modified video stream) to an end-user device, such as end-user device 204 or another, different end-user device. In this manner, an end user can view a live video stream being generated by end-user device 204.

In another example scenario, computing system 200 can include another component, such as a server (e.g., a streaming media server) that is configured for receiving a video stream and then transmitting the video stream to another computing device.

Figure 3:
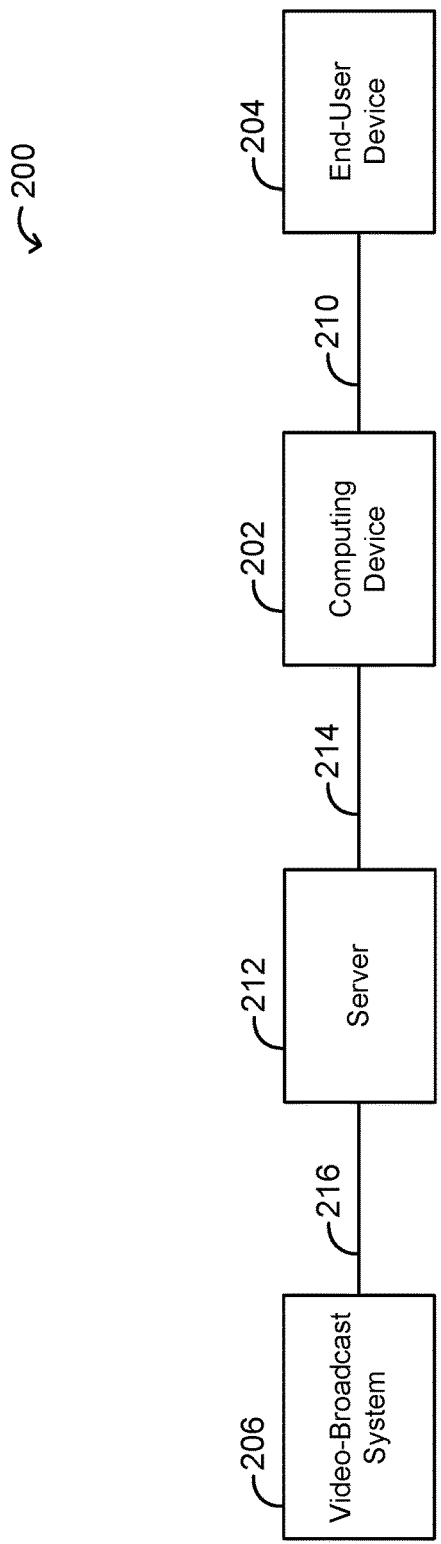
FIG. 3 is a simplified block diagram of another example computing system.

To illustrate this scenario, FIG. 3 is a simplified block diagram of computing system 200, where computing system 200 further includes server 212, which can be implemented as a computing system. Server 212 can sit between computing device 202 and VBS 206. As such, computing system 200 can include connection mechanism 214 between computing device 202 and server 212, and connection mechanism 216 between server 212 and VBS 206. In this scenario, as end-user device 204 generates the video stream, one or more components of computing system 200, such as computing device 202, can receive the video stream from end-user device 204 and can in turn provide the video stream to server 212. As such, server 212 can receive the video stream from computing device 202 and can in turn provide the video stream to VBS 206. VBS 206 can then in turn provide the video stream to an end-user device as discussed above.

In either scenario described above, VBS 206 can receive the video content and transmit the video content to an end-user device for presentation of the video content to an end user via a user interface. In practice, VBS 206 can transmit video content to a large number of end-user devices for presentation of the video content to a large number of end users. VBS 206 can include various components, such as a terrestrial antenna or a satellite, each of which can be implemented as a computing system. VBS 206 can also include a video-production system (VPS) that is configured to receive video content from another component of computing system 200 (e.g., computing device 202, or server 212) and/or generate its own video content. Either type of video content can serve as or be made part of a video program (e.g., a news program).

In this disclosure, the term "video broadcast" means the distribution of video content via any means. As such, VBS 206 can transmit video content to an end-user device in various ways. For example, VBS 206 can transmit video content to an end-user device over-the-air or via a packet-based network such as the Internet.

Video content can be generated, transmitted, and/or received in various ways and/or according to various standards. For example, the act of generating video content can include generating a video stream representing the video content. As another example, the act of transmitting and/or receiving video content can include transmitting and/or receiving a video stream representing the video content, such as over Internet Protocol (IP) or in accordance with the HD-SDI standard. Also, the act of generating, transmitting, and/or receiving video content can include generating, transmitting, and/or receiving an encoded or decoded version of the video content.

Each of the video-based systems or devices described in this disclosure can include or be integrated with a corresponding audio-based system or device. Likewise, the video content described in this disclosure can include or be integrated with corresponding audio content. For instance, end-user device 204 can encode video content to generate a video stream, encode corresponding audio content to generate an audio stream, and then combine the video stream with the corresponding audio stream to generate a multimedia stream for transmission to another system or device.

III. Example Operations

Computing system 200 and/or components of computing system 200 can perform various acts. These and related features will now be described.

A. Generating a Video Stream

As noted above, a computing system such as end-user device 204 can generate a video stream representing video content.

The act of generating the video stream can be performed in various ways. In one example, in line with the discussion above, the camera (and perhaps additionally the frame grabber) of end-user device 204 can capture video content in the form of a series of frames, and can then transmit the video content to the encoder of end-user device 204. The encoder can then receive the video content from the camera or the frame grabber and can encode the video content in accordance with one or more encoding parameters to generate a video stream having a particular data rate. The encoder can also format the video stream into data packets and can transmit the packets to a memory buffer of end-user device 204, which in turn can receive and temporarily store the packets.

A data rate of a video stream refers to an amount of data of the video stream that is streamed per unit of time. In some instances, a data rate of a video stream can take the form of a "bit rate" (or "bitrate") of the video stream, which is the number of bits of the video stream that are streamed per unit of time, and which is quantified using units such as bits per second (bit/s, or bps). For example, a video stream having a bitrate of 500 kilobits per second (kbps) means that each second of the video stream contains 500 kilobits of data (i.e., the video stream is streamed at a rate of 500 kilobits per second).

A data rate of a video stream can affect various properties of the video stream, such as the quality (e.g., resolution) and size (i.e., the amount of data required to represent the video stream) of the video stream, as well as the rate at which the video stream takes up space in the memory buffer. To illustrate this, consider for example a first video stream having a first data rate and a second video stream having a second data rate that is lower than the first data rate. In this example, the first video stream having the higher data rate can be of higher quality than the second video stream and can require a higher amount of data to represent the first video stream (and thus take up more space in the memory buffer) than the amount of data required to represent the second video stream. Further, the first video stream can take up space in the memory buffer at a faster rate than the second video stream due to the encoder having more data to send to the memory buffer for the first video stream compared to the second video stream. In addition, assuming uniform packet size, the amount of packets of the first video stream stored in the memory buffer can be larger than the amount of packets of the second video stream stored in the memory buffer.

As noted above, the act of end-user device 204 encoding the video content can involve encoding the video content in accordance with one or more encoding parameters to generate the video stream. For example, end-user device 204 can encode the video content according to various encoding standards, such as the H.264 (MPEG-4 AVC) standard, the MPEG-2 Part 2 standard, or the VP8 standard. Such standards can affect the data rate of the resulting video stream while also affecting other properties of the resulting video stream as well.

To illustrate this, consider for example a scenario in which end-user device 204 encodes video content using a first standard (e.g., H.264) to produce a first video stream, and separately encodes the same video content using a second, different standard (e.g., MPEG-2 Part 2) to produce a second video stream. In this scenario, both the first video stream and the second video stream can have low data rates, but the first video stream can be of higher quality than the second video stream. Alternatively, the first video stream can have a lower data rate than the second video stream and be of higher quality than the second video stream.

End-user device 204 can select the data rate for the video stream in various ways. In some implementations, the act of end-user device 204 selecting the data rate can involve selecting an encoding standard for use in encoding the video content to generate the video stream having the data rate. For instance, end-user device 204 can have stored various encoding standard options from which to choose, and can select a particular encoding standard to be used as a default encoding standard unless instructed or configured to select a different encoding standard. In another instance, a user of end-user device 204 can specify a particular encoding standard via a user interface of end-user device 204 or by other means, thereby instructing end-user device 204 to use the user-specified encoding standard. In yet another instance, given a desired data rate, the act of end-user device 204 selecting the data rate can involve selecting the encoding standard that end-user device 204 should use to achieve the desired data rate. End-user device 204 can select the data rate for the video stream in other ways as well.

In some instances, end-user device 204 can select an encoding standard that causes the generated video stream to have a constant data rate. A video stream having a constant data rate means that the amount of data that is streamed per unit time is constant. For example, in a video stream having a constant bitrate of 500 kbps, each second of the video stream can contain 500 kilobits.

By contrast, in other instances, end-user device 204 can select an encoding standard that causes the generated video stream to have a variable data rate. A video stream having a variable data rate means that the amount of data that is streamed per unit time varies, rather than remain constant. For example, in a video stream having a variable bitrate, one second of the video stream can contain 375 kilobits, but the subsequent second can contain 500 kilobits. In this case, the video stream can have a bitrate of 375 kbps for the one second, but can then have a bitrate of 500 kbps for the subsequent second. As another example, the first three seconds of the video stream can each contain 500 kilobits, but the subsequent five seconds of the video stream can each contain 625 kilobits. In this other case, the video stream can have a bitrate of 500 kbps for the first three seconds, but can then have a bitrate of 625 kbps for the subsequent five seconds.

Reasons for using a variable data rate can vary. For instance, if it is desired for particular portions of the video stream to be of a higher quality and/or take up more space in the memory buffer, the encoder can encode the video content so those portions of the video stream have a higher data rate. Whereas, if it is desired for other portions of the video stream to be of a lower quality and/or take up less space in the memory buffer, the encoder can encode the video content so those other portions of the video stream have a lower data rate.

In some instances, the act of generating the video stream can also be considered to involve the end-user device 204 transmitting the video stream (i.e., the packets of the video stream) from the memory buffer to another memory buffer and/or device, such as to a second memory buffer of end-user device 204, or to computing device 202. In one example, in an arrangement where end-user device 204 has a cellular or Wi-Fi network connection, an entity of the cellular or Wi-Fi network can monitor the amount of packets in the second memory buffer of end-user device 204 and instruct end-user device 204 to transmit packets from the second memory buffer to the entity based on considerations of network bandwidth and/or other channel quality conditions. In some instances, the entity can be computing device 202. In other instances, the entity can be an entity separate from computing device 202 and instruct end-user device 204 to transmit packets from the second memory buffer to computing device 202.

The act of generating the video stream can involve other actions as well.

B. Receiving the Variable Data Rate Video Stream

As noted above, computing device 202 can receive, from a second computing system (e.g., end-user device 204), the variable data rate video stream that the second computing device generates.

In some aspects, the act of computing device 202 receiving the variable data rate video stream can involve computing device 202 receiving packets of the video stream from end-user device 204 via a communication interface with end-user device 204 (e.g., communication interface 106), and then transmitting the packets to a data storage unit (e.g., a memory buffer) of computing device 202, which can receive and temporarily store the packets.

The act of computing device 202 receiving the variable data rate video stream can also be considered to involve computing device 202 transmitting the packets of the video stream to a component of computing device 202 that is configured for modifying the video stream, such as a processor. In one example, computing device 202 can transmit the packets directly from the communication interface to the processor as the communication interface receives the packets, without computing device 202 storing the packets in the data storage unit of computing device 202. In another example, computing device 202 can transmit the packets from the data storage unit.

Further, the act of computing device 202 receiving the variable data rate video stream can also involve receiving the variable data rate video stream over a cellular or Wi-Fi network connection.

C. Determining the Target Constant Data Rate

As noted above, computing device 202 can determine a target constant data rate at which a third computing system (e.g., server 212) has requested to receive the video stream.

In practice, server 212 can be programmed, instructed, or otherwise configured to expect the video stream (or any video stream server 212 receives, for that matter) to have the target constant data rate. In some scenarios, it can be desirable for the target constant data rate to be higher than the variable data rate of the video stream. For instance, in an example scenario, end-user device 204 can be programmed, instructed, or otherwise configured to generate a video stream having a variable data rate that meets but does not exceed approximately 3 Mbps, whereas server 212 can be programmed, instructed, or otherwise configured to expect a target constant data rate of approximately 3.5 Mbps.

The act of computing device 202 determining the target constant data rate can occur in various ways. For instance, computing device 202 can receive from server 212 an indication of the target constant data rate. The indication can take the form of a message that includes data identifying the target constant data rate. Computing device 202 can receive the indication from other entities as well, such as VBS 206 or other computing systems to which the video stream is destined (e.g., a decoder), additionally or alternatively to receiving the indication from server 212. Computing device 202 can receive the indication of the target constant data rate from server 212 or such other entities without requesting the target constant data rate from server 212 or such other entities. To facilitate this, server 212 or such other entities can be configured to periodically and automatically transmit the indication to computing device 202. In a scenario where the target constant data rate changes, for instance, computing device 202 would thus be informed of the change without having to transmit a request the target constant data rate.

Additionally or alternatively, computing device 202 can receive the indication of the target constant data rate from server 212 or such other entities as a result of computing device 202 requesting the target constant data rate from server 212 or such other entities. In one example, the act of computing device 202 receiving the indication from server 212 can involve computing device 202 first transmitting to server 212 a request for the target constant data rate, such as a Simple Network Management Protocol (SNMP) query including a parameter requesting the target constant data rate. Server 212 can then transmit the indication to computing device 202 in response to receiving the request, and computing device 202 can then in turn receive the indication. In another example, the act of computing device 202 receiving the indication from server 212 can involve server 212 transmitting the indication to computing device 202 without computing device 202 having previously transmitted a request for the indication, and computing device 202 can then in turn receive the indication.

In some aspects, computing device 202 can store, in the data storage unit of computing device 202, data indicating the target constant data rate, and can refer to that data to determine the target constant data rate.

Computing device 202 can perform the act of determining the target constant data rate at various times. For instance, computing device 202 can determine the target constant data rate before, while, or after receiving the video stream from end-user device 204.

D. Dynamically Modifying the Variable Data Rate Video Stream

As noted above, while computing device 202 is receiving the video stream from end-user device 204, computing device 202 can modify the video stream to have a modified data rate that is based on the determined target constant data rate.

In some aspects, the act of computing device 202 modifying the video stream to have a modified data rate that is based on the target constant data rate can involve modifying the video stream to have a modified data rate that has a predefined threshold extent of similarity to the target constant data rate. In one instance, the act of computing device 202 modifying the video stream to have a modified data rate that has a predefined threshold extent of similarity to the target constant data rate can involve computing device 202 modifying the video stream to have a modified data rate that matches the target constant data rate. For example, if the target constant data rate is 1500 kbps, computing device 202 can modify the video stream to have a modified data rate of 1500 kbps. In another instance, the act of computing device 202 modifying the video stream to have a modified data rate that has a predefined threshold extent of similarity to the target constant data rate can involve computing device 202 modifying the video stream to have a modified data rate that either (i) matches the target constant data rate or (ii) is within a threshold extent of the target constant data rate. For example, computing device 202 can modify the video stream to have a modified data rate that is within 1 kbps of the target constant data rate.

In some implementations, the act of computing device 202 modifying the video stream to have a modified data rate that is based on the target constant data rate can also involve modifying the video stream to have a modified data rate that has a predefined threshold extent of similarity to the target constant data rate can involve modifying the video stream to have a modified data rate that (i) has a predefined threshold extent of similarity to the target constant data rate and (ii) does not exceed the target constant data rate. For example, computing device 202 can modify the video stream to have a modified data rate that is within 1 kbps of the target constant data rate, but does not exceed the target constant data rate.

Further, the act of computing device 202 modifying the video stream to have the modified data rate that is based on the target constant data rate can involve computing device 202 (i) determining a quantity of null packets (i.e., packets carrying no data and having a packet identifier (PID) of 8191) to add into the video stream to cause the video stream to have the modified data rate and (ii) adding null packets of the determined quantity into the video stream. For example, in a scenario in which computing device 202 determines the target constant data rate to be 1500 kbps and is receiving the video stream at 500 kbps, computing device 202 can determine a quantity of null packets that, when added into the video stream, would cause the data rate of the video stream to change from 500 kbps to 1500 kbps (e.g., to be exactly 1500 kbps, or within a threshold extent of 1500 kbps). As a more specific example in this scenario, computing device 202 can receive the video stream at 500 kbps for a first portion of the video stream (e.g., ten seconds of the video stream), and can then receive the video stream at 725 kbps for a second, subsequent portion of the video stream (e.g., the next ten seconds of the video stream). As such, while receiving the video stream at 725 kbps, computing device 202 can determine a quantity of null packets that, when added into the video stream, would cause the data rate of the video stream to change from 725 kbps to 1500 kbps.

As an alternative to null packets, the act of computing device 202 modifying the video stream to have the modified data rate that is based on the target constant data rate can involve computing device 202 adding into the video stream, in a similar manner as discussed above, some other type of data that would not corrupt the video stream. Other examples are possible as well.

As further noted above, while computing device 202 is receiving the video stream from end-user device 204, computing device 202 can transmit, to server 212, the "modified video stream"—namely, the video stream having the modified data rate. Computing device 202 can transmit the modified video stream to server 212 via a communication interface with server 212 (e.g., communication interface 106). Additionally or alternatively, computing device 202 can transmit the modified video stream to another computing system, such as VBS 204, in the same or a different manner. In some implementations, computing device 202 can transmit the modified video stream to server 212, and server 212 can then transmit the modified video stream to VBS 206, which in turn can receive and broadcast the modified video stream.

Figure 4:
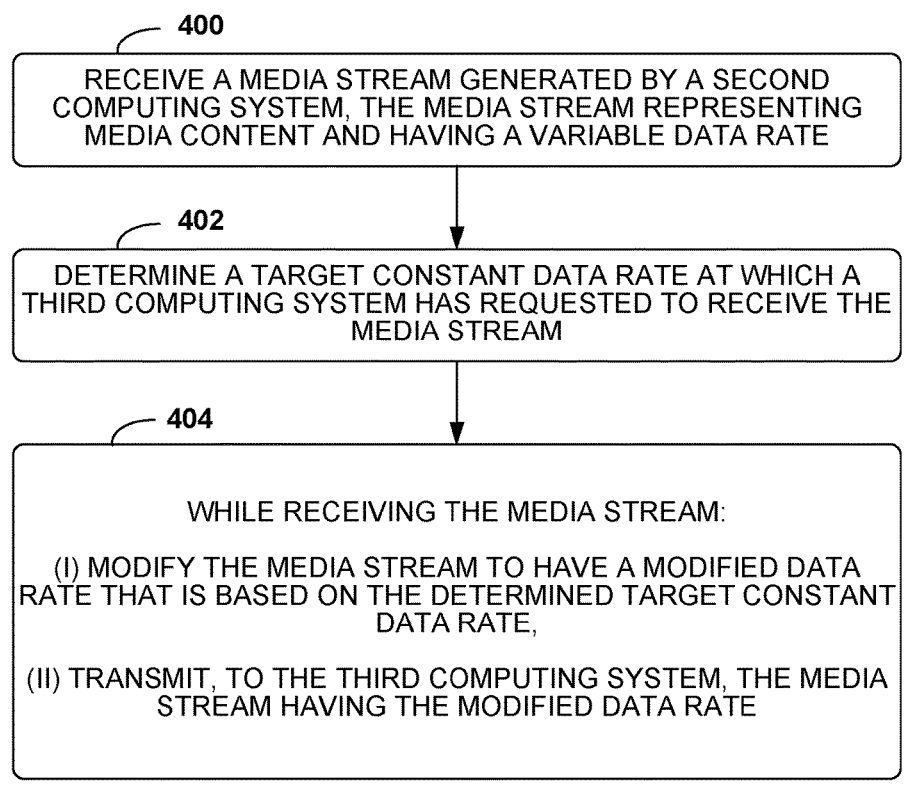
FIG. 4 is a simplified illustration of a flowchart of an example method.

FIG. 4 is a simplified illustration of an example flowchart for modifying a variable data rate of a media stream. In an example implantation, a first computing system such as computing device 202 performs the illustrated acts, although in other implementations, one or more other systems (e.g., VBS 206) can perform some or all of the illustrated acts.

As shown in FIG. 4, at block 400, the first computing system receives a media stream generated by a second computing system, the media stream representing media content and having a variable data rate.

Next, at block 402, the first computing system determines a target constant data rate at which a third computing system has requested to receive the media stream.

Next, at block 404, while receiving the media stream, the first computing system (i) modifies the media stream to have a modified data rate that is based on the determined target constant data rate, and (ii) transmits, to the third computing system, the media stream having the modified data rate.

IV. Example Variations

Although some of the acts and/or functions described in this disclosure have been described as being performed by a particular entity, such acts and/or functions can be performed by any entity, such as those described in this disclosure. Further, although the described acts and/or functions have been recited in a particular order, the acts and/or functions need not be performed in the order recited. However, in some instances, it can be desired to perform the acts and/or functions in the order recited. Further, each of the acts and/or functions can be performed responsive to one or more of the other acts and/or functions. Also, not all of the described acts and/or functions need to be performed to achieve one or more of the benefits provided by this disclosure, and therefore not all acts and/or functions are required.

Although certain variations have been discussed in connection with one or more example of this disclosure, such variations can also be applied to all of the other examples of this disclosure as well.

Although select examples of this disclosure have been described, alterations and permutations of these examples will be apparent to those of ordinary skill in the art. Other changes, substitutions, and/or alterations are also possible without departing from the invention in its broader aspects as set forth in the following claims.

What is claimed is:

1. A method comprising:
receiving, by a computing system, a media stream generated by an end-user device, the media stream representing media content and having a variable data rate;
transmitting, by the computing system, to a server device, data representing a request for an indication of a target constant data rate at which a video-broadcasting system has requested to receive the media stream;
receiving, by the computing system, from the server device, the indication of the target constant data rate in response to the request; and
while receiving the media stream:
 (i) modifying, by the computing system, the media stream to have a modified data rate that is based on the target constant data rate; and
 (ii) transmitting, by the computing system, to the video-broadcasting system, the media stream having the modified data rate, wherein the video-broadcasting system is configured to receive the media stream having the modified data rate and broadcast the media stream having the modified data rate.

2. The method of claim 1, wherein transmitting the media stream to the video-broadcasting system comprises transmitting the media stream to a streaming media server configured for receiving the media stream and for transmitting the media stream to the video-broadcasting system.

3. The method of claim 1, wherein modifying the media stream to have the modified data rate that is based on the target constant data rate comprises modifying the media stream to have a modified data rate that has a predefined threshold extent of similarity to the target constant data rate.

4. The method of claim 1, wherein modifying the media stream to have the modified data rate that is based on the target constant data rate comprises:
based on the variable data rate and the target constant data rate, determining a quantity of null packets to add into the media stream to cause the media stream to have the modified data rate; and
adding null packets of the quantity into the media stream.

5. A non-transitory computer readable medium having stored thereon instructions that, upon execution by a processor, cause performance of a set of acts comprising:
receiving, by a computing system, a media stream generated by an end-user device, the media stream representing media content and having a variable data rate;
transmitting, by the computing system, to a server device, data representing a request for an indication of a target constant data rate at which a video-broadcasting system has requested to receive the media stream;
receiving, by the computing system, from the server device, the indication of the target constant data rate in response to the request; and
while receiving the media stream:
 (i) modifying, by the computing system, the media stream to have a modified data rate that is based on the target constant data rate; and
 (ii) transmitting, by the computing system, to the video-broadcasting system, the media stream having the modified data rate, wherein the video-broadcasting system is configured to receive the media stream having the modified data rate and broadcast the media stream having the modified data rate.

6. The non-transitory computer readable medium of claim 5, wherein transmitting the media stream to the video-broadcasting system comprises transmitting the media stream to a streaming media server configured for receiving the media stream and for transmitting the media stream to the video-broadcasting system.

7. The non-transitory computer readable medium of claim 5, wherein modifying the media stream to have the modified data rate that is based on the target constant data rate comprises modifying the media stream to have a modified data rate that has a predefined threshold extent of similarity to the target constant data rate.

8. The non-transitory computer readable medium of claim 5, wherein modifying the media stream to have the modified data rate that is based on the target constant data rate comprises:

based on the variable data rate and the target constant data rate, determining a quantity of null packets to add into the media stream to cause the media stream to have the modified data rate; and adding null packets of the quantity into the media stream.

9. A computing system configured for performing a set of acts comprising:

receiving a media stream generated by an end-user device, the media stream representing media content and having a variable data rate;

transmitting, to a server device, data representing a request for an indication of a target constant data rate at which a video-broadcasting system has requested to receive the media stream;

receiving, from the server device, the indication of the target constant data rate in response to the request; and while receiving the media stream:

(i) modifying the media stream to have a modified data rate that is based on the target constant data rate; and (ii) transmitting, to the video-broadcasting system, the media stream having the modified data rate, wherein the video-broadcasting system is configured to receive the media stream having the modified data rate and broadcast the media stream having the modified data rate.

10. The computing system of claim 9, wherein transmitting the media stream to the video-broadcasting system comprises transmitting the media stream to a streaming media server configured for receiving the media stream and for transmitting the media stream to the video-broadcasting system.

11. The computing system of claim 9, wherein modifying the media stream to have the modified data rate that is based on the target constant data rate comprises modifying the media stream to have a modified data rate that has a predefined threshold extent of similarity to the target constant data rate.

12. The computing system of claim 9, wherein modifying the media stream to have the modified data rate that is based on the target constant data rate comprises:

based on the variable data rate and the target constant data rate, determining a quantity of null packets to add into the media stream to cause the media stream to have the modified data rate; and adding null packets of the quantity into the media stream.

\* \* \* \* \*